F. G. WHEELER.
METHOD AND MEANS OF TREATING COTTON-BALES FOR AND DURING COMPRESSION.
No. 182,339. Patented Sept. 19, 1876.
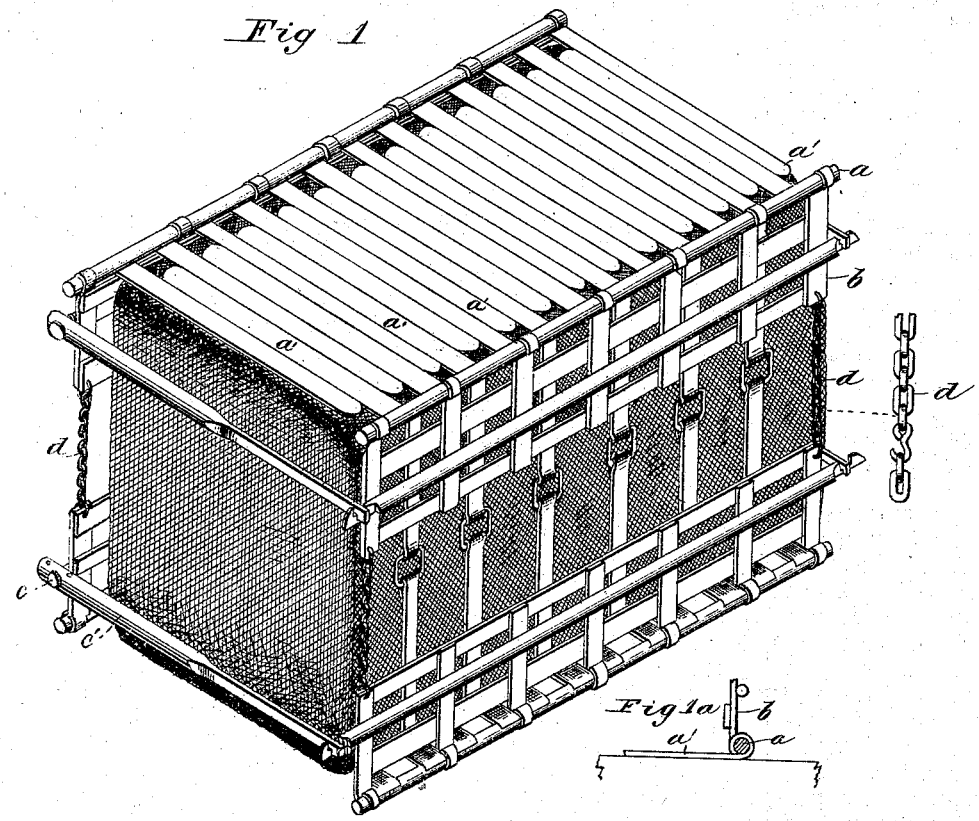
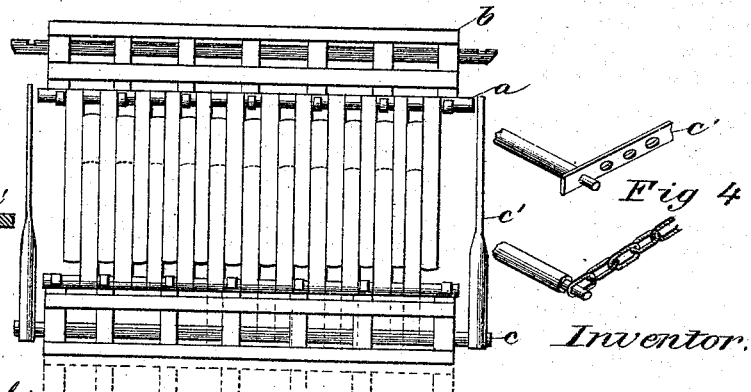
Witnesses
Harry C. Clark
John West
Inventor
F. G. Wheeler
by H. W. Beadle & Co.
Attys.

UNITED STATES PATENT OFFICE.

FREDERICK G. WHEELER, OF NEW YORK, N. Y.

IMPROVEMENT IN METHODS AND MEANS OF TREATING COTTON-BALES FOR AND DURING COMPRESSION.

Specification forming part of Letters Patent No. 182,339, dated September 19, 1876; application filed February 24, 1876.

*To all whom it may concern:*

Be it known that I, F. G. WHEELER, of New York, in the county of New York and State of New York, have invented a new and useful Method of and Means for Treating Cotton-Bales for and during Compression; and I do hereby declare that the following is a full and exact description of the same, reference being had to the accompanying drawings, and to the letters of reference marked thereon.

This invention consists, mainly, first, in a novel method of treating cotton-bales for compression, consisting, essentially, in applying the bands to the bale before it enters the press, and holding them before and during the time of compression by means of independent frames; second, in the peculiar means employed for carrying the method into effect, consisting, mainly, of certain independent frames, of special construction, as will be fully described hereinafter.

Figure 1 represents a perspective view of the method of applying the frames to the bale before it enters the press; Fig. 2, a plan view of one of the frames, showing its adjustability; Fig. 3, a cross-section, showing the method of uniting the plates of the frame, and Fig. 4 modified forms of fastenings for the ends of the braces.

To enable others skilled in the art to make and use my invention, I will now proceed to describe fully its construction and manner of operation.

A general description of my invention may be made as follows: The bale to be compressed is fully prepared for the press before it enters it, its old bands being removed and its new ones applied. These latter are held in place, and the shape of the bale also is preserved until it is finally compressed, by certain independent frames, which are temporarily applied to the top and bottom surfaces, and secured together, to permit the bale to undergo the necessary handling without disarrangement of its straps or displacement of its bulk.

Each frame is, preferably, made in two parts, adapted to be drawn apart or forced together, for the purpose of adjusting the frames, as a whole, to accommodate bales of varying width. Each is also provided with side frames or plates, hinged to the main frame, which are adapted to bend over the bands properly, and also to hold the corners and sides of the bale squarely in place.

$a$ represents the side rod of one of the parts, which is provided with a series of bars, $a'$, attached at right angles thereto, at proper distances apart, as shown. The edges of the bars are provided with curved or angular projections, Fig. 3, adapted to fit correspondingly-formed grooves in the opposite bars, as shown.

$b$ represents a side frame or plate, constructed in any suitable manner, and of proper material, which is hinged to the side rod of the main frame, as shown. These side frames should be so attached to the main frame as not to project below the outer surface of the main frame, in order that the latter may lie solidly upon the bed when in the press, as shown in Fig. 1.

$c$ represents a strengthening-bar, longitudinally attached to the side frame, as shown, which is provided at each end with a pivoted locking-bar, $c'$, adapted, at its free end by a series of hooks, to be caught into the notch in the corresponding bar of the other part.

$d\ d$ represent corner-connecting chains, provided with any suitable fastening devices.

The relation of the parts when united is represented in Fig. 1. One of these frames is adapted for the top surface of the bale, and the other for the bottom, the construction being the same, excepting that the notches and hooks of the holding-bars are located in reverse positions, in order that they may not be unlocked by gravity.

If desired, however, the bar may be so locked that the frames will be interchangeable, which result may be accomplished by the employment of rings or openings, in connection with a stud, as shown in Fig. 4, when, of course, both frames will be identical in construction.

The manner of using these frames is as follows: The bale to be operated upon, having been stripped of its old bands, or nearly so, is placed upon one of the frames, which, having been adjusted to suit the width of the bale, lies within the bands properly laid upon it, spread out upon the floor; or it may be upon a moving surface, adapted to carry it to the press. The bands are then placed upon the top surface, and covered by another frame. The side frames of each are then turned into position, properly locked, and the corner-chains fastened together, as indicated in Fig. 1, when the bale is ready for the press. After compression, the ends of the short bands are locked upon each side in any proper manner, and the side frame being unlocked, and the upper one removed, in any suitable manner, the bale is taken from the press. The lower frame is then taken out, to make the press ready for another bale.

The great advantage of this method is that any number of bales may be fully prepared for the press before entering it, so that the time occupied in treating the bale in the press is reduced to the minimum—a matter of great practical importance. By the employment, also, of the hinged frames the bales are caused to retain their shape against the tendency to lateral expansion, and hence the difficulties arising from this cause are avoided.

I do not limit myself to the precise construction shown. If desired, the frames may be constructed in other ways, and be provided with other means of adjustment. If desired, also, this method, and the means described, may be applied to other substances than to cotton.

Having thus fully described my invention, what I claim as new, and desire to secure by Letters Patent, is—

1. The method described of treating cotton-bales before and during compression, consisting, essentially, in applying the bands to the bale before it enters the press, and holding them before and during the time of compression by means of independent frames, substantially as described.

2. In combination with a bale and securing-bands laid upon the same, an independent removable frame for holding the bands in place, as described.

3. A frame adapted for adjustment to suit bales of different width, substantially as described.

4. A frame provided with side plates or bars, hinged thereto, as described.

5. An independent frame having side pieces adapted to hold the bale against lateral expansion, as described.

6. A frame having hinged sides and locking-bars, as described.

FREDERICK G. WHEELER.

Witnesses:
H. W. BEADLE,
HARRY C. CLARK.